United States Patent [19]
Fennern

[11] Patent Number: 5,106,573
[45] Date of Patent: Apr. 21, 1992

[54] BWR NATURAL STEAM SEPARATOR

[75] Inventor: Larry E. Fennern, San Jose, Calif.

[73] Assignee: General Electric Company, San Jose, Calif.

[21] Appl. No.: 667,716

[22] Filed: Mar. 11, 1991

[51] Int. Cl.$^5$ ............................................. G21C 15/00
[52] U.S. Cl. ................................... 376/371; 376/370; 376/373; 376/376
[58] Field of Search ............... 376/371, 373, 374, 377, 376/378, 370, 379

[56] References Cited

U.S. PATENT DOCUMENTS

| | | | |
|---|---|---|---|
| 4,345,549 | 8/1982 | Colmano | 122/34 |
| 4,879,087 | 11/1989 | Akiyama et al. | 376/216 |
| 4,912,733 | 3/1990 | Gluntz | 376/371 |
| 4,947,485 | 8/1990 | Oosterkamp | 376/210 |
| 5,019,328 | 5/1991 | Niino et al. | 376/310 |
| 5,053,188 | 10/1991 | Niino et al. | 376/277 |

OTHER PUBLICATIONS

Wilkins et al., *Advanced BWR: Design Improvements Build on Proven Technology*, Nuclear Engineering International, reprint Jun. 1986, pp. 1-7 and drawing entitled "The World's Reactors No. 89".

GKN, *Final Safeguards Summary Report on the Dodewaard Nuclear Power Plant*, Mar. 1967, Cover page, pp. 1-1-1, 3-6-2, 3-6-3, 3-6-4 and FIGS. 3.6.1 and 3.6.3.

*Primary Examiner*—Brooks H. Hunt
*Assistant Examiner*—Meena Chelliah
*Attorney, Agent, or Firm*—Robert R. Schroeder

[57] ABSTRACT

A steam separator for a boiling water reactor includes a pressure vessel and a chimney spaced radiallly inwardly therefrom to define a downcomer therebetween for recirculating water, the chimney being disposed above a reactor core for channeling upwardly therefrom steam voids and water flow. An annular partition wall is spaced radially between the vessel and he chimney to define an annular collection chamber having an inlet for receiving a portion of the steam voids and water flow from the chimney, a steam outlet for discharging the steam voids from the chamber, and a flow outlet for discharging the water flow from the chamber into the downcomer.

14 Claims, 5 Drawing Sheets

BWR NATURAL STEAM SEPARATOR

TECHNICAL FIELD

The present invention relates generally to boiling water reactors, and, more specifically, to a boiling water reactor (BWR) having natural, gravity affected steam separation from boiling water.

BACKGROUND ART

A conventional, nuclear boiling water reactor (BWR) typically includes a steam separator and a steam dryer for removing water moisture in the form of liquid from steam vapor generated by the boiling of water in the reactor core. Conventional steam separators are relatively complex structures requiring space inside a reactor pressure vessel and must be removed and inspected during every refueling outage. There presently exists an increased interest in developing advanced boiling water reactors which are fundamentally simpler than conventional boiling water reactors through the elimination of equipment, or the use of simpler, passive means for accomplishing certain functions of the reactor.

One option being considered is the use of natural separation by gravity of water, in its liquid phase, from the water/steam mixture resulting from the boiling of water by the reactor core within the reactor pressure vessel, without the need for an internal steam separator assembly which is conventionally used in boiling water reactors. Natural steam separation has been obtained in past designs of boiling water reactors, but, however, at relatively low power ratings. For example, in one prior boiling water reactor having low power output of about 60 megawatt electrical (MWe), natural water and steam separation is accomplished by providing a large cross section open plenum above the water level in the pressure vessel wherein liquid may separate from steam due to the natural effect of gravity acting thereon. As water is boiled by the reactor core, steam voids, or bubbles, are formed in the water and rise by their buoyancy to the water level. At the water level, the steam voids continue to rise due to their relatively low density, but, however, some water liquid also rises with the steam. If the velocity of the rising steam and water is relatively low, gravity is effective for causing much of the liquid to drop and separate from the steam. The required low exiting velocity of the steam and water mixture may be accomplished for low power density designs with low volume of steam and large upper plenum cross sectional area. For high power density designs with small diameter reactor pressure vessels, however, the steam leaving velocity is relatively high and gravity is no longer effective for acceptably separating the liquid from the steam.

The liquid carried with the steam upwardly above the water level in the reactor pressure vessel is called carryover and is undesirable. In one advanced BWR being presently considered, a 600 MWe power output is being considered in a reactor pressure vessel which is not proportionally larger than that for the 60 MWe design mentioned above, hence, with a correspondingly high leaving velocity of the steam from the water level interface. In order to effectively reduce the amount of carryover of liquid in the steam in such a relatively high power output reactor, steam separators are conventionally required. Furthermore, conventional steam dryers are also required to further remove any remaining liquid from the separated steam before being channeled to a conventional steam turbine for the extraction of energy therefrom for driving an electrical generator, for example.

Furthermore, since a conventional BWR reactor is an annular structure, the water is heated by the core more quickly adjacent to the center of the core than around its perimeter. As a result, the steam leaving velocity from the water level, or water-steam interface, has a nonuniform distribution from the center of the pressure vessel and radially outwardly therefrom, with higher leaving velocities at the former and lower leaving velocities at the latter. Accordingly, the high center steam leaving velocities further decrease the ability for obtaining natural separation of the liquid from the steam, which, therefore, requires the use of conventional mechanical steam separators.

Natural circulation, or recirculation, of the water coolant contained in the reactor vessel of a BWR is also being considered for the simplified designs. Natural recirculation of reactor coolant is accomplished by density differences between the relatively cool water in the downcomer channel disposed between the pressure vessel wall and both the reactor core and a tall riser, or chimney, extending upwardly therefrom, and the relatively hot water being boiled in the core, which has steam voids rising therein. The low density water/steam mixture rises naturally from the core and upwardly through the chimney, with the steam being dispelled upwardly from the water level/interface above the top of the chimney, and the remaining water being recirculated radially outwardly from the vessel centerline and downwardly through the downcomer. Conventional cool feedwater is returned from the steam turbine and condensors and reintroduced into the pressure vessel by conventional spargers for mixing with the coolant flowing downwardly in the downcomer. The sparger feedwater mixes with the recirculating coolant in the vessel at the top of the downcomer for reducing its temperature, and therefore increasing its density, which assists in causing the coolant to fall naturally by gravity in the downcomer to the bottom of the pressure vessel wherein it turns upwardly to repeat the cycle through the reactor core.

This natural recirculation of the water up through the core and chimney and down through the downcomer provides a crossflow of the water radially outwardly from the vessel centerline toward the downcomer just below the water level. This crossflow conventionally effects carryunder of some of the steam voids with the water as it turns to begin its journey back downwardly through the downcomer. Carryunder of steam is generally undesirable because it increases the average temperature of the recirculating water carried downwardly in the downcomer, and therefore, typically requires lower temperature feedwater from the sparger to quench steam bubbles, or cool, the recirculating water which necessarily results in reduced thermal efficiency. Furthermore, the higher temperature of the water due to carryunder of steam also reduces the average density thereof, especially if the steam voids are not totally quenched, and decreases the natural recirculation flow.

OBJECTS OF THE INVENTION

Accordingly, one object of the present invention is to provide natural separation of steam and water in a high power density (and high total power output) boiling water reactor.

Another object of the present invention is to provide a simpler steam separator having low steam carryunder.

Another object of the present invention is to provide a simpler steam separator having low water carryover.

Another object of the present invention is to provide a steam separator having improved distribution of steam leaving velocities from the water-steam interface.

Another object of the present invention is to provide a steam separator effective for separating steam naturally by using gravity, and without the need for a conventional mechanical steam separator above the water level.

Another object of the present invention is to provide a steam separator effective for obtaining improved thermal efficiency in a high power, natural circulation boiling water reactor.

Another object of the present invention is to provide load following capability (modulation of reactor power output) for a natural circulation BWR by varying the effectiveness of the steam separation process.

DISCLOSURE OF INVENTION

A steam separator for a boiling water reactor includes a pressure vessel and a chimney spaced radially inwardly therefrom to define a downcomer therebetween for recirculating water flow, the chimney being disposed above a reactor core for channeling upwardly therefrom steam voids and water flow. An annular partition wall is spaced radially between the vessel and the chimney to define an annular collection chamber having an inlet for receiving a portion of the steam voids and water flow from the chimney, a steam outlet for discharging the steam voids from the chamber, and a flow outlet for discharging the water flow from the chamber into the downcomer.

BRIEF DESCRIPTION OF DRAWINGS

The novel features characteristic of the invention are set forth and differentiated in the claims. The invention, in accordance with preferred and exemplary embodiments, together with further objects and advantages thereof, is more particularly described in the following detailed description taken in conjunction with the accompanying drawing in which:

MODE(S) FOR CARRYING OUT THE INVENTION

Figure 1:
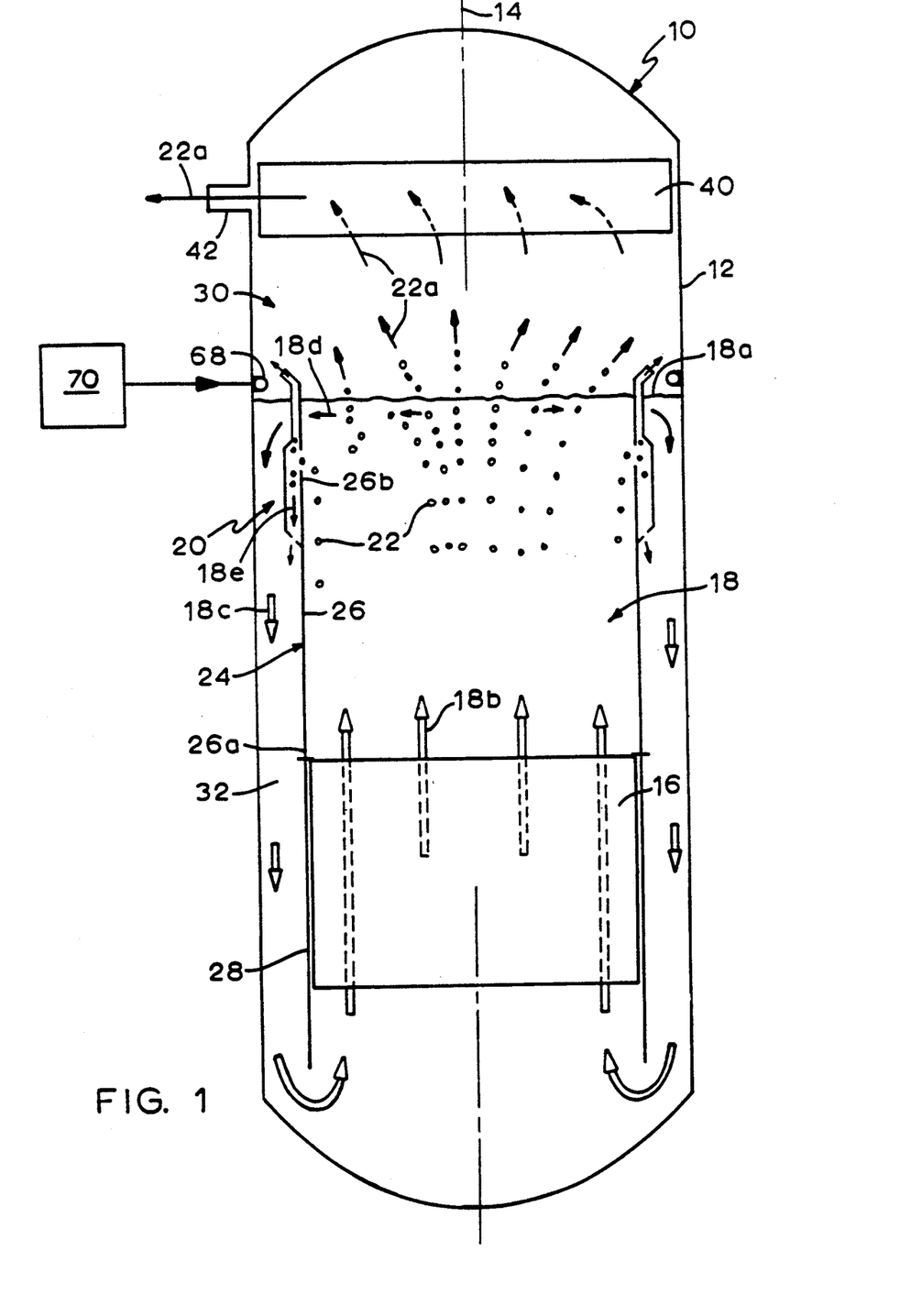
FIG. 1 is a longitudinal sectional, schematic representation of an exemplary, simplified boiling water reactor having a natural steam separator in accordance with one embodiment of the present invention.

Illustrated in FIG. 1 is a schematic representation of an exemplary, advanced simplified boiling water reactor (SBWR) 10. The reactor 10 includes a reactor pressure vessel 12 defined by an annular vessel wall having top and bottom heads disposed coaxially about a longitudinal centerline axis 14. Disposed inside the vessel 12 is a conventional reactor core 16, and the vessel 12 contains water 18 disposed to a predetermined level 18a above the core 16.

In accordance with one embodiment of the present invention, a steam separator 20 is provided for separating naturally by gravity a portion of steam voids, or bubbles, shown schematically by circles 22 from the water 18 being boiled by the core 16. The separator 20 includes a chimney 24 having an annular chimney outer wall 26 disposed above the core 16 and below the water level 18a.

More specifically, the chimney wall 26 includes a proximal 26a disposed adjacent to the core 16, and generally coextensively with an annular, conventional core shroud 28 surrounding the core 16; and a distal end 26b disposed below the water level 18a. The chimney 24 is effective for channeling upwardly therein the steam voids 22 and water flow, indicated by arrows 18b, to the water level 18a. When the steam voids 22 reach the water level 18a, which is alternatively referred to as the water-steam interface, the steam from the voids 22 is dispelled longitudinally upwardly against the force of gravity into a vessel upper plenum 30 extending upwardly from the water level 18a for receiving the dispelled steam voids 22 as steam 22a, indicated by arrows, generated by the core 16.

The chimney wall 26 and the core shroud 28 are spaced radially inwardly from the vessel 12 to define an annular downcomer 32 therebetween which extends from the wall distal end 26b downwardly to the lowermost end of the core shroud 28 for recirculating the water flow 18b from the chimney 24, downwardly through the downcomer 32 as downcomer flow 18c, and back up into the core 16 for repeating its recirculation cycle.

It has been observed that a substantial amount of carryunder of the steam voids 22 for a boiling water reactor system originates from the peripheral region of the chimney 24 near the chimney outer wall 26 as opposed to the center region of the chimney 24. The steam voids 22 exiting the chimney 24 adjacent to the outer wall 26 encounter water crossflow 18d which is a flow of a portion of the water 18 near the water level 18a from the centerline 14 of the reactor 10 and of the chimney 24 radially outwardly toward the vessel 12. The crossflow 18d quickly positions some of the steam voids 22 over the downcomer 32 without allowing such steam voids 22 to complete their rise to the water level 18a above the chimney 24 for being dispelled therefrom. The steam voids 22 entrained by the crossflow 18b, therefore, become drawn down the downcomer 32 as part of the recirculating downcomer flow 18c. The steam voids 22 exiting the chimney 24 near the centerline 14, on the other hand, necessarily have a longer distance to travel before being positioned over the downcomer 32 and follow flowpaths closer to the water level 18a. Such steam voids 22 therefore have a greater probability of escaping (and most do) the crossflow 18d and the downcomer flow 18c by upward movement through the water level 18a and up into the upper plenum 30 due to their buoyant forces in the water 18 and their relatively low density.

Figure 2:
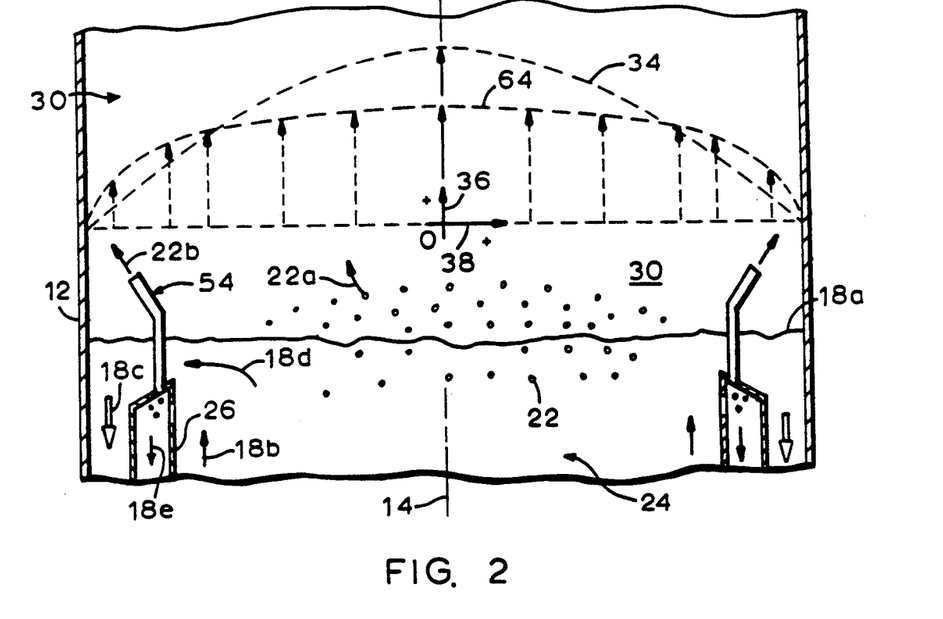
FIG. 2 is an enlarged longitudinal sectional view of the reactor illustrated in FIG. 1 near the water-steam interface showing schematically steam leaving velocity profiles.

Illustrated in FIG. 2 is the portion of the reactor pressure vessel 12 near the water line 18a. Shown schematically above the water line 18a is a simplification of a conventional velocity profile 34, shown in dashed line, for the steam voids 22 exiting the water-steam interface at the water level 18a. The conventional profile 34 indicates that the velocity of the exiting steam voids 22 is substantially greater near the centerline 14 of the vessel 12 and decreases to minimum values at the radially outer circumference of the upper plenum 30 at the inner surface of the vessel 12. The velocity of the exiting steam voids 22 is indicated on a vertical axis 36 and the radial position for the exiting steam voids 22 is indicated on the horizontal, radial axis 38 measured outwardly from the centerline 14.

The velocity profile 34, along with the crossflow 18d, are indicative of two operating conditions, i.e., steam carryunder and liquid carryover. Steam carryunder as described above is less likely to occur near the center of the chimney 24 since the steam leaving velocities are relatively high and the crossflow 18d is relatively low, and increases in likelihood and extent near the chimney outer wall 26 where the steam leaving velocity is relatively low and the crossflow 18d is relatively high.

Liquid carryover, on the other hand, is more likely to occur, and in fact occurs, in a natural circulation boiling water reactor at the high steam leaving velocity region near the centerline axis 14 since gravity is effective for separating liquid from the steam 22a exiting the water-steam interface 18a only at relatively low, conventionally known leaving velocities. In a conventional boiling water reactor having a relatively high power output, the steam leaving velocities near the centerline 14, as represented by the velocity profile 34, are larger than those required for obtaining natural, gravity separation of the water from the steam 22a, which is one reason why conventional mechanical steam separators are utilized.

Referring again to FIG. 1, a conventional steam separator (not shown) would typically be positioned between the water level 18a and the top of the vessel 12. For further reducing the moisture content of the steam from such a conventional separator, a conventional steam dryer 40 is also used, and is used in the reactor 10 illustrated in FIG. 1. Conventional steam separators and the conventional dryer 40 operate on different principals, with the former typically relying on the use of centrifugal force to separate the water from the steam by promoting swirl flow inside tubing, and the latter typically using perforated plates for condensing off most of any remaining water from the steam. The steam 22a from the dryer 40 is suitably channeled from the reactor 10 through a main steam line nozzle or outlet 42 to a conventional steam turbine (not shown) for driving a conventional electrical generator (not shown) for generating electrical power, for example.

Figure 3:
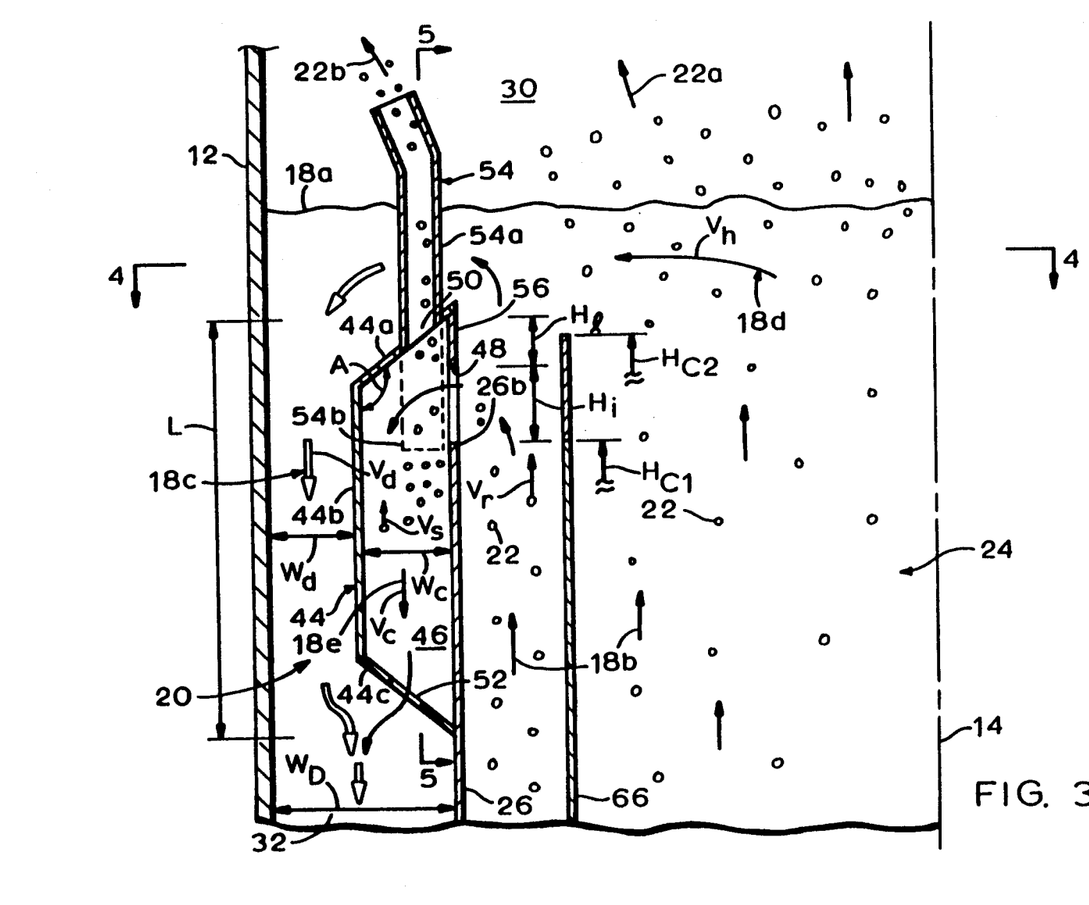
FIG. 3 is an enlarged longitudinal sectional view of a portion of the steam separator illustrated in FIG. 1.

In accordance with the present invention, a conventional mechanical steam separator is not employed between the dryer 40 and the water level 18a, but instead, the natural, gravity operated steam separator 20 is utilized to take advantage of the observation that a majority of the steam void carryunder originates near the chimney outer wall 26. Referring to FIG. 3, the steam separator 20, in accordance with one embodiment of the present invention, is shown in more detail and includes an annular partition wall 44 spaced radially between the vessel 12 and the chimney outer wall 26 at the distal end 26b to define with the chimney wall 26 an annular collection chamber 46, or inner downcomer region, disposed coaxially about the centerline 14. The portion of the downcomer 32 disposed between the vessel 12 and the wall 44 may be, alternatively, referred to as the outer downcomer region. The chamber 46 includes an annular inlet 48 for receiving a portion of the steam voids 22 along with a portion of the water flow 18b from the chimney 24, designated as chamber water flow 18e, a steam outlet 50 for discharging the steam voids 22 as separated steam 22b from the chamber 46 to the upper plenum 30 above the water level 18a, and a water flow outlet 52 for discharging the chamber water flow 18e from the chamber 46 downwardly into the downcomer 32.

The partition wall 44 preferably includes a top portion 44a having a plurality of circumferentially spaced collection pipes 54 disposed in flow communication between the chamber 46 and the upper plenum 30 to define a plurality of the steam outlets 50, respectively. The partition wall 44 further includes an imperforate, preferably cylindrical middle portion 44b extending downwardly from and integral with the top portion 44a, and a bottom portion 44c extending downwardly from and integral with the middle portion 44b which is fixedly joined to the chimney outer wall 26. As used herein, the references to vertical, top, middle, bottom, and similar references refer to the relative placement of components in the reactor 10 relative to the longitudinal centerline axis 14 along which the forces of gravity are directed. The partition bottom portion 44c includes a plurality of circumferentially spaced apertures which define a plurality of the flow outlets 52, respectively, disposed in flow communication with the chamber 46 and the downcomer 32.

The steam separator 20 further includes an annular collection lip 56 extending from the partition top portion 44a and spaced upwardly from the chimney wall distal end 26b, and preferably vertically aligned therewith to define therebetween the inlet 48.

The separator 20 takes advantage of both the existence of a substantial number of the steam voids 22 near the chimney outer wall 26 and the relative velocity between the steam voids 22 in the water flow. More specifically, and as illustrated in FIG. 3, the steam voids 22 have a relative terminal rise velocity $V_r$ in the water flow 18b due to their buoyancy therein which causes them to rise vertically in the chimney 24. The crossflow 18d has a horizontal velocity and $V_h$, the downcomer flow 18c in the outer downcomer region has a velocity $V_d$. In a conventional boiling water reactor, the crossflow velocity $V_h$ and the analogous downcomer velocity $V_d$ relative to the terminal rise velocity $V_r$ of the steam voids 22, considering also the sizes of the steam voids 22, is such that carryunder of a significant number of the steam voids 22 occurs downwardly into the downcomer 32.

However, in order to decrease carryunder of the steam voids 22, the partition wall 44 is sized and configured so that the relative terminal rise velocity, designated $V_s$, of the steam voids 22 being initially carried downwardly with the chamber water flow 18e in the chamber 46 is greater than the downward velocity $V_c$ of the chamber water flow 18e being channeled downwardly in the chamber 46 for allowing the steam voids 22 to decelerate, stop, and then rise inside the chamber 46, separate from the water flow 18e, and collect therein for discharge from the chamber 46 by the collection pipes 54. Since the chamber inlet 48 is positioned above the chimney outer wall 26 and in flow communication with the chimney 24 a substantial number of the steam voids 22 are channeled therein and then downwardly in the chamber 46 due to the 180° change in direction of the water flow 18b which is discharged as the chamber water flow 18e downwardly from the chamber outlet 52. This allows the steam voids 22 to separate in the chamber 46 for collection and discharge therefrom.

Analysis indicates that for the embodiment of the steam separator 20 illustrated in FIG. 3, a first portion of the steam voids 22 collects in the chamber 46 at its upper end between the top portion 44a and the lip 56. Analysis also indicates that a second portion of the steam voids 22 collects inside the chamber 26 immediately below the chimney outer wall distal end 26b near the chamber entrance 48.

Accordingly, the collection pipes 54 preferably include a plurality of circumferentially spaced first collection pipes 54a having bottom ends disposed coextensively, or vertically aligned with the partition top portion 44a for receiving and discharging from the chamber 46 the first portion of the steam voids 22 collecting inside the lip 56. A plurality of second collection pipes 54b, shown in dashed line in FIG. 3, has bottom ends disposed generally coextensively, or vertically aligned with the chimney wall distal end 26b for receiving and discharging from the chamber 46 the second portion of the steam voids 22 collecting at that location. Preferably the bottom ends of the second collection pipes 54b are disposed just below the inlet 48 at the chimney wall distal end 26b.

Figure 4:
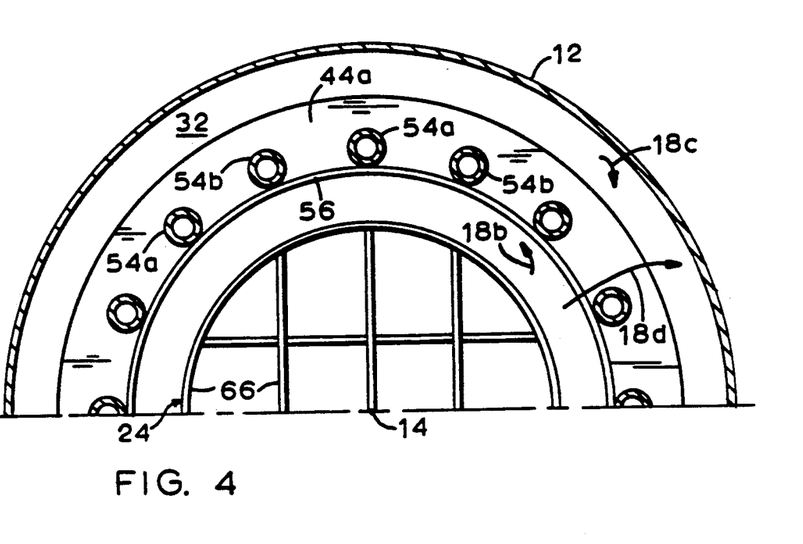
FIG. 4 is a transverse sectional view of the steam separator illustrated in FIG. 3 taken along line 4—4.
Figure 5:
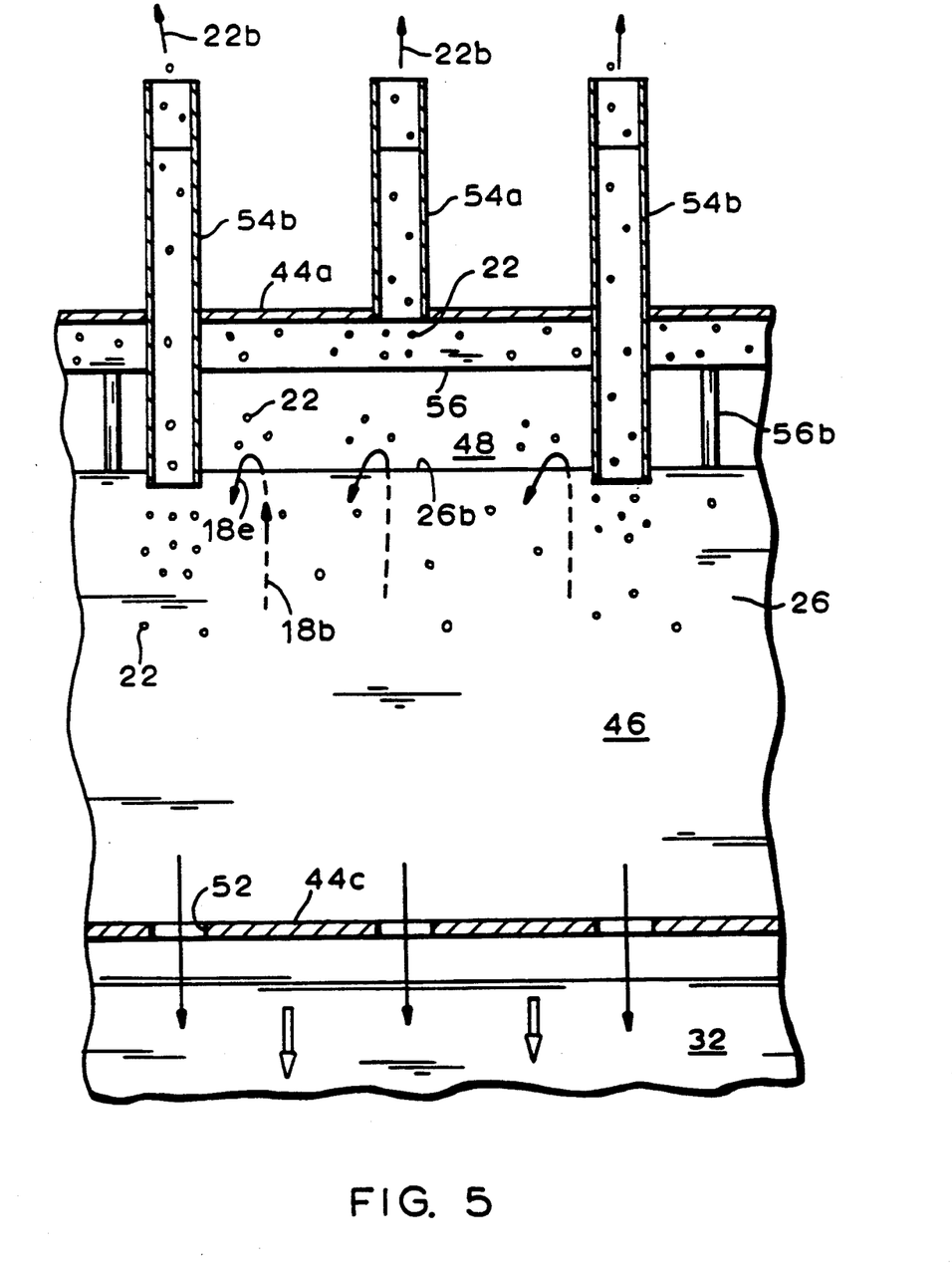
FIG. 5 is a longitudinal transverse sectional view of a portion of the steam separator illustrated in FIG. 3 taken along line 5—5.

FIGS. 4 and 5 show in additional detail the preferred arrangement of the first and second collection pipes 54a and 54b. The first and second pipes 54a and 54b are circumferentially spaced from each other and uniformly around the circumference of the chamber 46 for effectively discharging the separated steam voids 22 from the chamber 46. The lip 56 may be supported solely by the partition top portion 44a, by being fixedly joined thereto, or may be additionally supported to the chimney outer wall 26 at the distal end 26b by a plurality of circumferentially spaced struts 56b.

Referring again to FIG. 3, the preferred configuration and sizing of the separator 20, including the partition wall 44, includes a preferred height $H_i$ of the inlet 48 above the chimney wall distal end 26b; the elevation, or height $H_l$ of the lip 56 above the top of the chimney 24, for example, above the chimney outer wall distal end 26b and the inlet 48; the configuration or curvature of the partition top portion 44a; and the width $W_c$ or inside diameter of the partition middle portion 44b; which are determined for each particular design so that a predeterminedly large fraction of the water flow 18b being channeled upwardly along the inside surface of the chimney outer wall 26 enters the chamber 46 through the inlet 48. The particular sized of the inlets 48, i.e., $H_i$, and of the chamber outlets 52 are also predetermined for each particular design for obtaining a downward recirculation of the water flow 18e through the chamber 46 with a preferred downward velocity $V_c$ which is less than or equal to the terminal upward rise velocity $V_s$ of the steam voids 22, or, alternatively, $V_s$ being greater than $V_c$, which are swept along with the water flow 18e from the chamber inlet 48. The steam voids 22 which enter the chamber 46 rise therein against the downward flow of the water flow 18e therein and collect near the lip 56 and the inlet 48 at the chimney wall distal end 26b as described above. The collection pipes 54 provide a protected path for the steam voids 22 to escape upwardly from the chamber 46 through the crossflow 18d and upwardly beyond the surface of the water level 18a into the upper plenum 30.

Although the partition bottom portion 44c is shown as a conical member extending downwardly and radially inwardly from the partition middle portion 44b, it may have any suitable configuration to include the outlets 52 for discharging the water flow 18e downwardly from the chamber 46. The partition top portion 44a may also have several configurations including the preferred configuration illustrated in FIG. 3. The partition top portion 44a preferably extends radially inwardly and upwardly in the form of a cone from the partition middle portion 44b to the lip 56 at an obtuse angle A relative to the partition middle portion 44b and the centerline 14. The lip 56 preferably extends downwardly from the top portion 44a toward the chimney wall distal end 26b and is aligned coextensively, or vertically therewith for forming a protected area at the top of the chamber 46 for collecting the first portion of the steam voids 22. The steam voids 22 will rise in the chamber 46 to the radially inner end of the top portion 44a adjacent to the lip 56, and accordingly, the first collection pipes 54a are preferably disposed adjacent to the chimney 24 and generally coextensively and vertically aligned with the outer wall 26 for receiving the first portion of the steam voids 22. As indicated above, since the second portion of the steam voids 22 collect adjacent to the chimney wall distal end 26b, the second collection pipes 54b are also preferably disposed adjacent to the chimney 24 and aligned generally coextensively and vertically with the chimney outer wall 26 inside the chamber 46.

Figure 6:
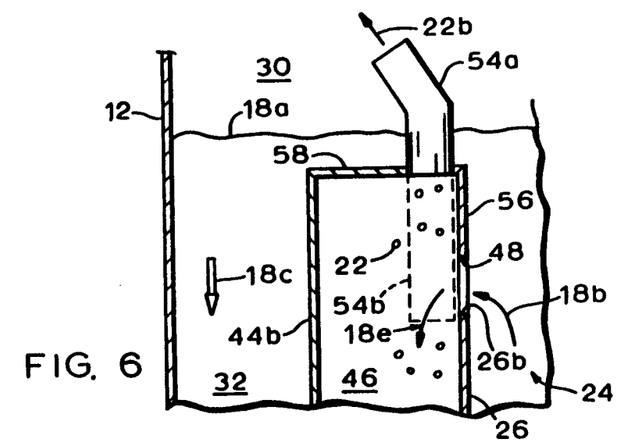
FIG. 6 is a longitudinal sectional view of the top portion of a steam separator in accordance with an alternate embodiment of the present invention.

Illustrated in FIG. 6 is an alternate embodiment of the partition top portion 44a indicated by numeral 58. The partition top portion 58 extends horizontally relative to the partition middle portion 44b and the centerline axis 14 radially inwardly toward the chimney 24, and the lip 56 preferably extends downwardly from the top portion 58 toward the chimney wall distal end 26b and vertically aligned therewith for channeling the first portion of the steam voids 22 into the first collection pipes 54a. Both the first and second collection pipes 54a and 54b are positioned as described above with respect to their position in the FIG. 3 embodiment.

Figure 7:
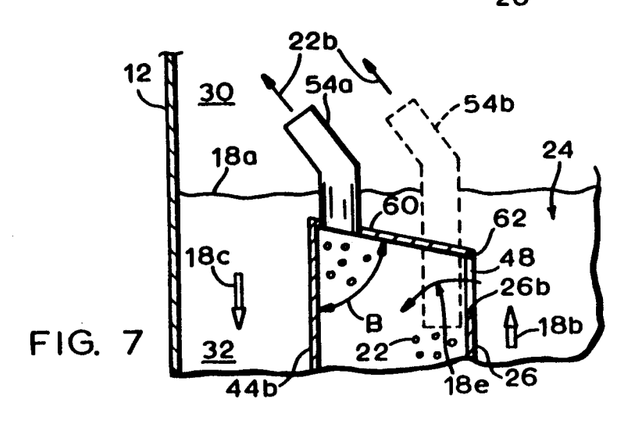
FIG. 7 is a longitudinal sectional view of the top portion of a steam separator in accordance with an alternate embodiment of the present invention.

Illustrated in FIG. 7 is yet another embodiment of the partition top portion 44a indicated by numeral 60. In this embodiment, the partition top portion 60 extends radially inwardly and downwardly from the partition middle portion 44b, in the form of a cone, at an acute angle B relative thereto and ending in a lip 62 which is simply the distal end of the top portion 60. The lip 62 is spaced vertically above the chimney wall distal end 26b to define the chamber inlet 48 which receives the water flow 18b and the steam voids 22. In this embodiment of the invention, the second collection pipes 54b may be positioned identically as described above with respect to the embodiment illustrated in FIG. 3, whereas, the first collection pipes 54a are preferably disposed adjacent to the partition middle portion 44b, with the bottom ends thereof being disposed adjacent to the middle portion 44b at the top portion 60. In this way, the first portion of the steam voids 22 may be collected near the vertically top end of the top partition 60, its proximal end, adjacent to the partition middle portion 44b and discharged into the upper plenum 30 by the first collection pipe 54a.

Referring again to FIG. 3, the chimney outer wall 26 is preferably cylindrical and the partition wall 44 preferably extends radially outwardly therefrom so that the width $W_d$ of the downcomer 32 at the partition middle portion 44b (outer downcomer region) is less than the width $W_D$ of the downcomer 32 downstream, or vertically below the partition bottom portion 44c. The width $W_c$ of the collection chamber 46, or inner downcomer region, plus the width $W_d$ of the outer downcomer region is equal to the total width $W_D$ of the downcomer 32 immediately below the partition 44. In this way, the downcomer flow velocity $V_d$ between the vessel 12 and the partition middle portion 44b will be increased relative to a design without the partition 44 having a constant flow area downcomer 32. This may tend to increase steam carryunder in this region. However as described above, the steam separator 20 is effective for substantially reducing steam carryunder from the chimney 24 around the chimney outer wall 26 and the partition 44 into the downcomer 32, and therefore any remaining steam carryunder in the flow channeled above the partition 44 and into the downcomer 32 is relatively small. The net effect of utilizing the steam separator 20 is an overall reduction in steam carryunder into the downcomer 32.

Furthermore, the higher velocities $V_d$ in the outer downcomer region may increase the horizontal velocity $V_h$ of the crossflow 18d near the surface of the water level 18a which may enhance the radial expansion of the steam 22a above the water level 18a resulting in lower average steam leaving velocities from the water-steam interface 18a for obtaining reduced liquid carryover by increased liquid separation from the steam 22a.

More specifically, and as shown in FIGS. 2 and 3, the collection pipes 54 extend vertically upwardly from the chamber 46 around the chimney outer wall 26 and therefore are effective for discharging the steam voids 22 as the separated steam 22b from the chamber 46 adjacent to the inner surface of the vessel 12 in the upper plenum 30 for reducing the average steam leaving velocities of the steam 22a discharged from the water level 18a for reducing water carryover in the steam. Without the steam separator 20, the steam leaving velocities have a relatively high average velocity and a generally centerpeaked velocity profile such as the exemplary profile 34 illustrated in FIG. 2.

The steam separator 20 is effective for removing some of the steam voids 22 from the water flow 18b and discharging the resulting separated steam 22b from the collection pipes 54 into the outer perimeter of the upper plenum 30. As a result thereof, increased radial expansion and a more uniform radial distribution of the steam, i.e., 22a and 22b, results in the upper plenum 30, which may be represented schematically by the exemplary improved velocity profile 64 shown in dashed line. Steam radial expansion beyond the radially outer boundary of the chimney 24, and over the downcomer 32, is enhanced, and results generally in lower steam leaving velocities from the water-steam interface 18a.

Natural separation by gravity is, therefore, more effective, and the height requirement of the upper plenum 30 for obtaining natural steam separation therein, is reduced, which may be used for obtaining a shorter reactor pressure vessel 12. As illustrated in FIG. 2 and 3, the top portions of the outlet pipes 54 may be inclined radially outwardly from the centerline 14 for discharging the separated steam 22b closer to the inner surface of the vessel 12 for further improving the uniformity of the steam leaving velocity and reducing the average thereof.

Referring again to FIGS. 3 and 4, the chimney 24 may further include a plurality of flow partitions 66 spaced radially inwardly from the chimney outer wall 26 to define vertically extending chimney flow channels. The height of the chimney 24 is preferably at least as high as the height of the chimney wall distal end 26b, i.e., $H_{c1}$. In one embodiment, the chimney partitions 66, which define the central chimney flow channels, are staggered higher relative to the chimney outer wall 26, or at a height $H_{c2}$, reducing the velocity $V_h$ of the crossflow 18d over the outermost flow channels from centerline 14, and therefore steam carryunder.

The steam separator 20 in accordance with the present invention is effective for reducing steam carryunder in the downcomer 32, and may be significant in increasing the radial expansion of the steam in the upper plenum 30 for reducing moisture carryover. For a given limiting steam carryunder design restriction, a relatively smaller diameter reactor pressure vessel 12 is possible by using the separator 20. Furthermore, the height of the vessel 12 may also be reduced as a result of the improved efficiency of water-steam separation in the upper plenum 30 from the improved radial uniformity of steam leaving velocities from the water level 18a.

Since the coolant water 18 is being recirculated in the simplified BWR 10 by natural means due to density differences between the water flow 18c in the downcomer 32 and the water flow 18b and steam void 22 mixture in the chimney 24, low carryunder is desirable to maximize the density of the water flow 18c in the downcomer 32 in order to produce the required recirculation flow with the shortest chimney 24, and, in turn, the shortest height of the reactor pressure vessel 12. Natural circulation of coolant is also enhanced by reducing irreversible pressure drop losses in the coolant recirculation loop, and from this perspective the present invention provides for a greatly reduced pressure drop loss relative to the conventional mechanical steam separators.

Furthermore, since less steam carryunder from the chimney 24 and into the downcomer 32 results from use of the steam separator 20, less quenching of the downcomer flow 18c is required by the returning feedwater channeled into the reactor 10 through a conventional feedwater sparger 68 as shown schematically in FIG. 1. The feedwater is provided to the sparger 68 by conventional means 70, which includes a feedwater pump for pumping the resulting liquid condensed from the steam 22a provided to the steam turbine. The temperature of the feedwater provided by the sparger 68 is conventionally relatively lower than the temperature of the downcomer flow 18c for providing acceptable quenching thereof for conventional operation of the reactor core 16. However, since steam carryunder is effectively reduced by the steam separator 20 in accordance with the present invention, higher than conventional feedwater temperatures may be possible, since less quenching is required, which results in higher levels of thermal-to-electric efficiency of the reactor 10 and the steam turbine-generator driven thereby.

Furthermore, it is not necessary to remove the described steam separator 20 from the reactor pressure vessel 12 in order to periodically refuel the reactor (i.e., replace spent fuel assemblies with fresh fuel), as is presently the case with the conventional mechanical steam separator assembly. This is possible since the device described does not interfere or block the cross sectional area above the chimney, through which fuel assemblies must be raised or lowered while moving fuel to and from the reactor core 16 and the refueling floor elevated above the reactor pressure vessel 12. This feature provides for improvement in critical path time to complete refueling during the plant refueling and maintenance outage, and eliminates the need to provide for interim steam separator assembly storage volume in the reactor building.

Figure 8:
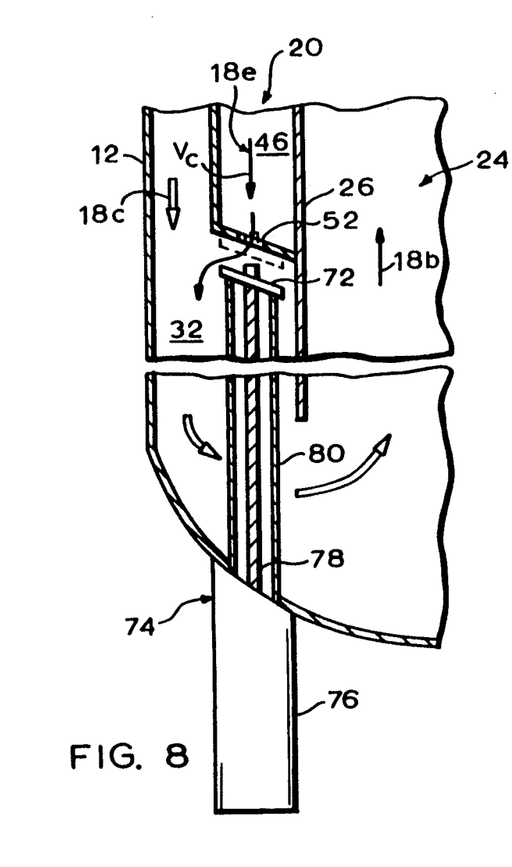
FIG. 8 is a longitudinal sectional view of the bottom portion of a steam separator in accordance with an alternate embodiment of the present invention including a longitudinally translatable damper for controlling discharge flow from the outlet of the steam separator.

Illustrated in FIG. 8 is another embodiment of the steam separator 20 in accordance with the present invention which further includes a plurality of circumferentially spaced dampers 72 each positioned adjacent to a respective one of the chamber flow outlets 52. Each of the dampers 72 is positionable by means 74 between closed (shown in dashed line) and open positions (shown in solid line) for selectively controlling the velocity $V_c$ of the water flow 18e through the chamber 46 and out the outlets 62. The positioning means 74 are conventional, such as those used conventionally for positioning control rods by electrical or hydraulic means, and include a conventional drive 76 effective for translating vertically an output rod 78 joined to the damper 72 inside a conventional guidetube 80.

The chamber flow outlets 52 are preferably sized so that when the dampers 72 are positioned to a fully open position, the velocity $V_c$ of the water flow 18e through the chamber 46 exceeds, or is greater than the terminal rise velocity $V_s$ of the steam voids 22 in the chamber 46, thusly carrying the steam voids 22 along with the chamber water flow 18e through the outlets 52 and into the downcomer 32. In this way, the level of the steam carryunder through the chamber 46 and the downcomer 32 may be controlled, which in turn regulates core power and neutron spectrum shift in the BWR 10 through inlet enthalpy and flow variations of the reactor core 16. Accordingly, load following capability may be provided with resulting improved fuel cycle economics.

For example, increased carryunder of the steam voids 22 may be provided by the chamber 46 than would otherwise occur without the use of the chamber 46, for effectively varying core inlet enthalpy and flow for regulating core power. Increased steam carryunder results in hotter downcomer flow 18c, due to the heating effect of the steam voids 22, which reduces the density of the downcomer flow 18c and thus reduces the natural recirculation of the water flow 18c from the downcomer 32 and into the core 16 (i.e. water flow 18b). The water flow 18b channeled upwardly through the core 16, will accordingly, boil sooner than it otherwise would which increases the number of steam voids 22 and reduces moderation of neutrons for reducing nuclear reaction rate for dropping power output from the reactor 10. Correspondingly, the neutron spectrum shifts to a harder spectrum providing additional conventionally known benefits including the use of fertile fuel for absorbing neutrons instead of using additional control rods.

The damper 72 may also be positioned from the fully opened position to a partly closed position for causing the terminal rise velocity $V_s$ to be greater than the velocity $V_c$ of the water flow 18e downwardly in the chamber 46 for reducing steam carryunder as described above.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention. For example, other various geometries of the chimney 26 and steam separator collection chamber 46 may be used. Although the outer wall of the chimney 26 and the partition wall 44 are preferably cylindrical, they could have any suitable configuration including irregular shapes, and could also be arcuate portions which do not extend completely around the centerline axis 14.

Accordingly, what is desired to be secured by Letters Patent of the United States is the invention as defined and differentiated in the following claims:

1. A steam separator for a boiling water reactor comprising:
 a reactor pressure vessel having a reactor core disposed therein and containing water disposed at a level above said core with a vessel upper plenum extending upwardly from said water level for receiving steam generated by said core;
 a chimney including an annular chimney wall having a proximal end disposed adjacent to said core and a distal end disposed below said water level for channeling upwardly therein steam voids and water flow from said core, said chimney wall being spaced radially inwardly from said vessel to define a downcomer therebetween for recirculating said water flow from said chimney over said chimney wall distal end and downwardly through said downcomer and back to said core; and
 an annular partition wall spaced radially between said vessel and said chimney wall at said distal end to define the said chimney wall an annular collection chamber having an inlet for receiving a portion of said steam voids and water flow from said chimney, a steam outlet for discharging said steam voids as separated steam from said chamber to said upper plenum above said water level, and a flow outlet for discharging said water flow from said chamber into said downcomer.

2. A steam separator according to claim 1 wherein said partition wall includes:
 a top portion having a plurality of circumferentially spaced collection pipes disposed in flow communication between said chamber and said upper plenum to define a plurality of said steam outlets, respectively;
 a middle portion extending downwardly from said top potion; and
 a bottom portion extending downwardly from said middle portion to said chimney wall, and having a plurality of circumferentially spaced apertures defining a plurality of said flow outlets, respectively, disposed in flow communication with said chamber and said downcomer.

3. A steam separator according to claim 2 further including a lip extending from said partition top portion and spaced upwardly from said chimney wall distal end to define therebetween said inlet.

4. A steam separator according to claim 3 wherein said collection pipes include first collection pipes having bottom ends disposed coextensively with said partition top portion for discharging from said chamber a first portion of said steam voids, and second collection pipes having bottom ends disposed generally coextensively with said chimney wall distal end for discharging from said chamber a second portion of said steam voids.

5. A steam separator according to claim 4 wherein said partition wall is sized and configured so that a terminal rise velocity of said steam voids in said chamber is greater than a velocity of said water flow downwardly in said chamber for allowing said steam voids to rise inside said chamber for discharge by said first and second collection pipes.

6. A steam separator according to claim 5 wherein said partition middle portion is spaced radially outwardly form said chimney wall so that a width of said downcomer at said partition middle portion is less than a width of said downcomer downstream of said partition.

7. A steam separator according to claim 5 wherein said first and second collection pipes discharge said steam voids from said collection chamber adjacent to said vessel in said upper plenum for reducing average leaving velocities of said steam discharged from said water level for reducing water carryover in said steam.

8. A steam separator according to claim 5 wherein said partition top portion extends horizontally from said middle portion radially inwardly toward said chimney, and said lip extends downwardly from said top portion toward said chimney distal end for channeling said steam voids first portion into said first collection pipes.

9. A steam separator according to claim 5 wherein said partition top portion extends radially inwardly and downwardly from said middle portion toward said chimney ending in said lip, and said first collection pipe bottom ends are disposed adjacent to said middle portion at said top portion, and said second collection pipe bottom ends are disposed adjacent to said chimney wall distal end.

10. A steam separator according to claim 5 wherein said partition top portion extends radially inwardly and upwardly from said middle portion toward said chimney, and said lip extends downwardly from said top portion toward said chimney wall distal end for channeling said steam voids first portion into said first collection pipes.

11. A steam separator according to claim 10 wherein both said first and second collection pipes are disposed adjacent to said chimney.

12. A steam separator according to claim 11 wherein said chimney further includes a plurality of flow partitions spaced radially inwardly from said chimney wall and having a height at least as high as a height of said chimney wall distal end.

13. A steam separator according to claim 4 further including:
a plurality of dampers, each disposed adjacent to a respective one of said chamber flow outlets, and positionable between closed and open positions for selectively controlling velocity of said water flow through said chamber; and
means for positioning said dampers between said open and closed positions.

14. A steam separator according to claim 13 wherein said chamber flow outlets are sized so that when said dampers are positioned to a fully open position a velocity of said water flow through said chamber exceeds a terminal rise velocity of said steam voids in said chamber.

* * * * *